United States Patent [19]

Nilssen

[11] E Patent Number: Re. 32,901

[45] Reissued Date of Patent: Apr. 4, 1989

[54] SERIES-RESONANT ELECTRONIC BALLAST CIRCUIT

[76] Inventor: Ole K. Nilssen, Caesar Dr., Barrington, Ill. 60010

[21] Appl. No.: 924,852

[22] Filed: Oct. 28, 1986

Related U.S. Patent Documents

Reissue of:

[64] Patent No.: 4,538,095
Issued: Aug. 27, 1985
Appl. No.: 500,841
Filed: Jun. 3, 1983

[51] Int. Cl.[4] ..... H05B 37/00

[52] U.S. Cl. ..... 315/244; 315/225; 315/DIG. 7

[58] Field of Search ..... 315/224, 225, 244, 127; 361/18, 101; 363/25, 55

[56] References Cited

U.S. PATENT DOCUMENTS

| | | | |
|---|---|---|---|
| 3,668,471 | 6/1972 | Ambler et al. | 361/45 |
| 4,184,128 | 1/1980 | Nilssen | 315/DIG. 2 |
| 4,370,600 | 1/1983 | Zansky | 315/DIG. 7 |
| 4,378,514 | 3/1983 | Collins | 315/276 |
| 4,398,126 | 8/1983 | Zuchtriegel | 315/127 |
| 4,507,698 | 3/1985 | Nilssen | 361/42 |
| 4,538,095 | 8/1985 | Nilssen | 315/DIG. 7 |
| 4,554,487 | 11/1985 | Nilssen | 315/127 |
| 4,563,719 | 1/1986 | Nilssen | 361/42 |
| 4,663,571 | 5/1987 | Nilssen | 315/DIG. 5 |
| 4,675,576 | 6/1987 | Nilssen | 315/DIG. 7 |

FOREIGN PATENT DOCUMENTS

| | | | |
|---|---|---|---|
| 2019677 | 10/1979 | United Kingdom | 307/326 |

OTHER PUBLICATIONS

Millman, *Microelectronics*, McGraw-Hill Book Company, 1979, p. 33.

*Primary Examiner*—David K. Moore
*Assistant Examiner*—Mark R. Powell

[57] ABSTRACT

Subject invention relates to an inverter-type electronic fluorescent lamp ballast wherein a series-resonant LC circuit connected across the inverter's output is used for matching the inverter's operating characteristics to those of the fluorescent lamp—the fluorescent lamp being connected in parallel with the tank-capacitor of this LC circuit. In particular, the invention relates to the use of a Varistor coupled in parallel with this tank-capacitor, thereby limiting the voltage developed thereacross to a magnitude suitable for proper lamp starting. Moreover, by providing for means whereby the inverter shuts itself off in case current flows through this Varistor for more than about one second or so (which is the maximum length of time that it should normally take for a fluorescent lamp to start), inverter as well as Varistor overload protection is obtained. Without such overload protection the inverter and/or the Varistor would self-destruct in case the fluorescent lamp failed to start or if it were removed from the circuit. Also, to mitigate the possibility of electric shock hazard for persons servicing fluorescent lighting fixtures using ballasts based on subject invention—as might occur if someone were to touch a terminal at one end of a fluorescent lamp while inserting the other end into its socket—the inverter will shut itself off immediately in case there is flow of current directly from one of the ballast terminals and to earth ground.

34 Claims, 1 Drawing Sheet

SERIES-RESONANT ELECTRONIC BALLAST CIRCUIT

Matter enclosed in heavy brackets [ ] appears in the original patent but forms no part of this reissue specification; matter printed in italics indicates the additions made by reissue.

BACKGROUND OF THE INVENTION

1. Field of Invention

The present invention relates to inverter-type electronic ballasts for fluorescent lamps, particularly of the type using series-resonant LC circuit means for matching the inverter's operating characteristics to those of the fluorescent lamp.

2. Description of Prior Art

Inverter-type fluorescent lamp ballasts in which a series-resonant LC circuit is used for matching the inverter's operating characteristics to those of the fluorescent lamp (i.e., series-resonance-loaded inverter ballasts) have been described in published literature, such as in U.S. Pat. No. 3,710,177 to Richard Ward or U.S. Pat. No. 4,370,600 to Zoltan Zansky.

In these ballasts, the fluorescent lamp is typically connected in parallel with the tank-capacitor of the series-resonant LC circuit, and the high voltage developed across this tank-capacitor (due to so-called Q-multiplication) is used for starting and operating the fluorescent lamp.

However, if the load is removed from such a series-resonant LC circuit, which occurs whenever the lamp is removed therefrom or whenever the lamp fails to operate (as is bound to happen toward end of normal lamp life), the voltage developed across the tank-capacitor (and thereby the power drawn by the series-resonant circuit) will become so high as to cause circuit damage—except if some form of over-voltage or over-current protection has been provided.

While Ward does not describe any specific means of over-voltage protection, Zansky does provide for such means in the form of a voltage-clamping arrangement; which arrangement operates to limit the voltage across the tank-capacitor by way of using the inverter's DC supply-voltage as a load for the series-resonant LC circuit whenever the magnitude of the voltage across the tank-capacitor exceeds a certain pre-determined multiple of the magnitude of the DC supply-voltage. Of course, to permit proper lamp starting, it is necessary that this clamping-voltage limit be set higher than the worst-case lamp starting-voltage for the minimum anticipated DC supply-voltage.

In summary, although the best arrangement that can be found among all known prior art voltage-clamping circuits does indeed provide a degree of mitigation against over-voltage and excess power-draw as resulting from having an unloaded series-resonant LC circuit connected directly across the output of an inverter, it provides far from a fully satisfactory solution. Some of its more serious limitations are as follows:

(a) Although the typical prior art voltage-clamping arrangement significantly limits the net power drawn by the overall ballasting system in case of an inoperative lamp, the amount of power that has to be handled by the inverter itself has been limited to a much lesser degree: it still has to handle on a continuous basis all the power associated with having the voltage-clamping arrangement connected across the tank-capacitor—which voltage-clamping arrangement, as far as the inverter and the LC circuit are concerned, is just another load. This implies that the transistors of the inverter have to be able to handle on a continuous basis several times the amount of power that they have to handle in order to provide just for the continuous operation of the regular fluorescent lamp load. (Note: For a fixed input voltage to a series-resonant LC circuit, the power absorbed by a load connected across the tank-capacitor of the LC circuit is substantially proportional to the magnitude of the voltage developed across the tank-capacitor.)

(b) With the DC supply-voltage being used as the voltage-clamping means, the clamping-voltage limit is fully dependent upon the magnitude of this DC supply-voltage. Thus, in cases where the magnitude of the DC supply-voltage may change (as it invariably will in situations where the DC supply-voltage is derived from an ordinary electric utility power line), it is necessary to arrange for the clamping-voltage to be adequately high for proper lamp starting even at the lowest anticipated level of DC supply-voltage; which implies that the clamping-voltage will be that much higher for the maximum anticipated level of DC supply-voltage. Thus, the demands on the inverter in terms of power handling capabilities increase in proportion to the ratio of maximum-to-minimum levels of DC supply-voltage. (Or, conversely, there is a distinct limitation on the minimum level of DC supply-voltage for which the ballast will be able to start the fluorescent lamp.)

(c) Even though the inverter in the ballast may be able to handle on a continuous basis the excess current that results with an inoperative fluorescent lamp, there is a significant amount of wasted power associated with doing so; which implies that—in case such an inoperative fluorescent lamp is left connected with the ballast for an extended period of time, as is indeed apt to occur near end of lamp life—a significant amount of energy is wasted.

Of course, it would be possible to use an ordinary voltage clamping means (such as a Varistor or a Zener diode) for providing the requisite voltage-clamping effect; except that this would result in such a gross amount of excess power dissipation as to be non-feasible both from the viewpoint of size and cost of the voltage-clamping means itself as well as from the viewpoint of excessive energy waste.

Yet, this approach does have the advantage of providing the fluorescent lamp with a starting voltage of substantially constant magnitude regardless of relatively wide variations in the magnitude of the DC supply-voltage.

And then, there is still another potentially serious limitation associated with prior art circuit arrangements: namely, the possibility that a person changing a fluorescent lamp powered by one of their ballasts may receive a serious electric shock.

In particular, during the installation of a fluorescent lamp, a person may hold onto one end of a lamp while inserting the other end into its socket, thereby providing a conductive path to earth ground. Thus, in the absence of means for providing electrical isolation from the power line, such a condition is apt to give rise to a substantial ground-fault current flowing through the person; which, if permitted to last for more than a very short time, may cause serious physiological damage.

Thus, while there are several inherent and potentially important advantages associated with resonance-loaded inverter ballasts, the several limitations associated with such ballasts according to prior art are severe enough to prevent their widespread application.

SUMMARY OF THE INVENTION

Objects of the Invention

A first object of the present invention is that of providing a basis for designing safe and cost-effective inverter-type ballasts for gas discharge lamps.

A second object is that of providing a basis for designing an inverter circuit that is capable of being operated safely and effectively by way of a series-resonant circuit.

A third object is that of providing a basis for designing safe, cost-effective and high-efficiency series-resonance-loaded inverter ballasts for fluorescent lamps.

These as well as other objects, features and advantages of the present invention will become apparent from the following description and claims.

Brief Description

In a preferred embodiment, subject invention constitutes a series-resonance-loaded fluorescent lamp ballast comprising the following key component parts:

a source of DC voltage, which DC voltage is derived by rectification of the AC voltage obtained by way of a pair of power-line-conductors connected with a regular 60 Hz power line;

an inverter connected with said source of DC voltage and operative to provide across an output a relatively high-frequency squarewave voltage, said inverter comprising a disable-means operative on receipt of a disable-signal to disable inverter operation and thereby to remove said squarewave voltage from said output;

a series LC circuit connected across said output, said LC circuit being substantially series-resonant at the fundamental frequency of said squarewave voltage;

means for disconnectably connecting a fluorescent lamp across the tank-capacitor of said LC circuit, said fluorescent lamp requiring for proper starting a voltage of magnitude above a certain threshold level;

a voltage-clamping-means and a current-sensor-means connected in series across said tank-capacitor, said voltage-clamping-means being operative to limit the magnitude of the voltage across said tank-capacitor to a level higher (but not substantially higher) than said threshold level, said current-sensor-means being operative to sense the clamping-current flowing through said voltage-clamping-means and to provide a clamping-current-signal-output whenever clamping-current is flowing therethrough;

integration-means connected in circuit between said clamping-current-signal-output and said inverter disable-means, said integration-means being operative to provide said disable-signal to said distable-means whenever clamping-current has been flowing for a period of time longer than about one second, which is the maximum period of time normally required for starting said fluorescent lamp;

ground-fault-current-sensing-means connected in circuit with said power-line-conductors and operative to provide a ground-fault-current-signal-output in response to any ground-fault-current flowing through said power-line-conductors; and converter-means connected in circuit between said ground-fault-current-signal-output and said disable-means, said convert-means being operative to provide said disable-signal to said disable-means whenever the magnitude of said ground-fault-current has exceeded a predetermined level for about 25 milli-second;

whereby the inverter is rendered disabled if: (i) the fluorescent lamp fails to present a load to said series LC circuit for more than about one second; or: (ii) excessive ground-fault-current flows for about 25 milli-second.

Comparing the operation of the ballast of subject invention with that of resonance-loaded ballasts of prior art, such as that described by Zansky, it is noted that all the indicated limitations have been mitigated:

(a) The amount of power that has to be handled by the inverter on a continuous basis has been limited to just the amount required for operating the fluorescent lamp;

(b) With a Varistor used as the voltage-clamping means, the magnitude of the starting voltage presented to the fluorescent lamp is essentially independent of the magnitude of the DC supply-voltage, which implies that the ballast of subject invention will be able to start and operate the fluorescent lamp over a wide range of DC supply-voltage magnitudes;

(c) Since the inverter is disabled within a second or so in case the fluorescent lamp fails to operate (or if the lamp is removed), no significant amount of energy is wasted even if an inoperative fluorescent lamp is left connected for an extended period of time (For the same reason, the power rating of the requisite voltage-clamping-means may be quite modest.); and (d) Means have been provided whereby excessive ground-fault currents are prevented, thereby mitigating electric shock hazards to service personnel.

In other words, in a series-resonance-loaded inverter-type ballast, the present invention provides for inverter operation to stop: (i) in case adequate circuit loading fails to exist for a period of time longer than about one second, or (ii) if an excessive ground-fault-current flows for a period of time longer than about 25 milli-second.

As a matter of general information, it is noted that the length of time it normally takes for a fluorescent lamp to start is apt to be too long a period for a person to be exposed to a sizable electric current; which constitutes the reason for the much shorter (25 milli-second or so) reaction time in case of excessive ground-fault-current as compared to the relatively long (one second or so) reaction time in case of inadequate circuit loading.

DESCRIPTION OF THE PREFERRED EMBODIMENT

Description of the Drawing

Figure 1:
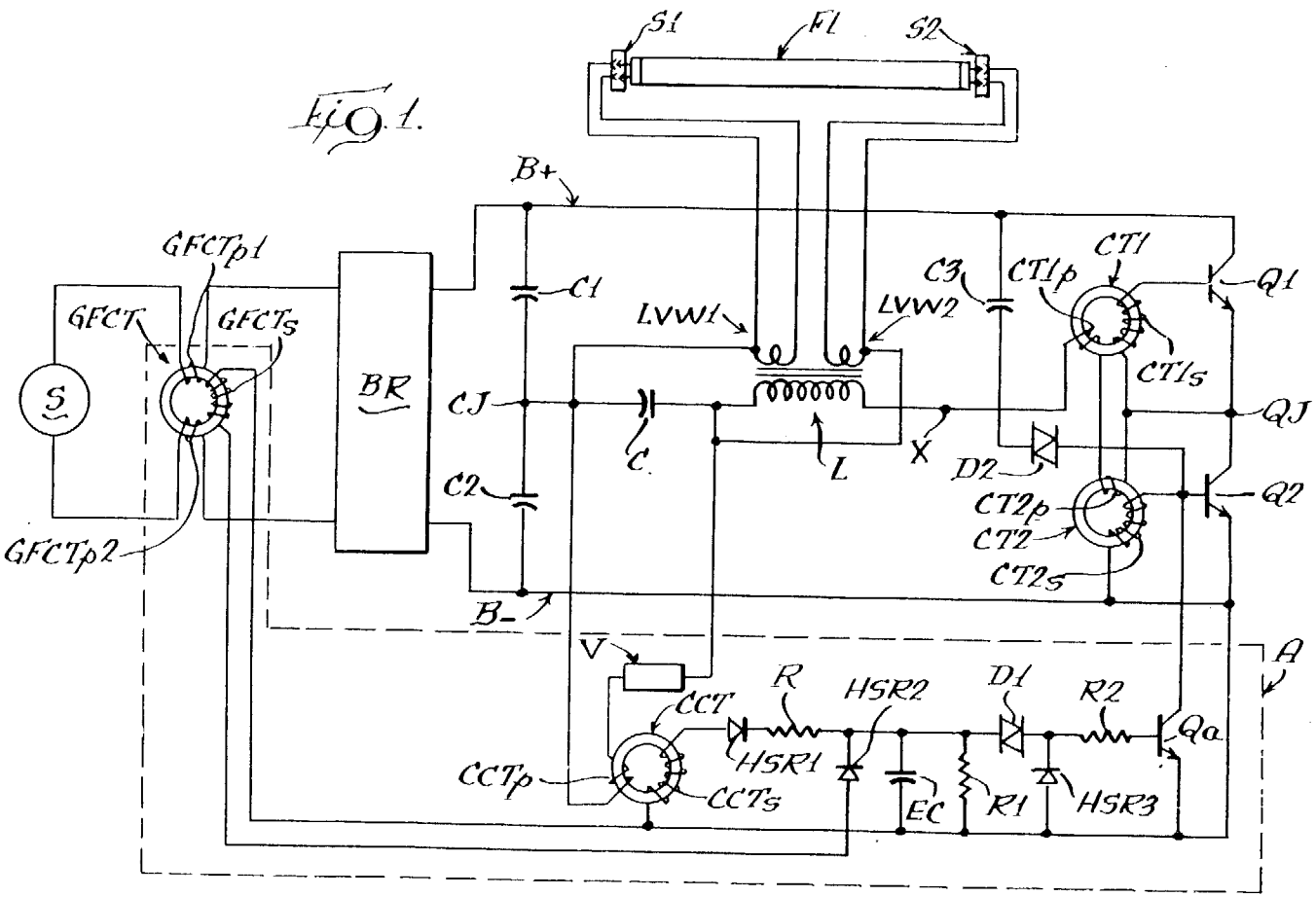
FIG. 1 schematically illustrates a series-resonance-loaded inverter ballast for a fluorescent lamp according to the preferred embodiment of the present invention.

In FIG. 1, a source S of 120 Volt/60 Hz voltage is applied, by way of the two primary windings GFCTp1 and GFCTp2 of ground-fault-current-transformer GFCT, to a full-wave bridge rectifier BR, the unidirectional voltage output of which is applied directly between a B+ bus and a b− bus, with the positive voltage being connected to the B+ bus.

Between the B+ bus and the B− bus are connected a series-combination of two transistors Q1 and Q2 as well as a series-combination of two energy-storing capacitors C1 and C2.

The secondary winding CT1s of positive feedback current transformer CT1 is connected directly between the base and the emitter of transistor Q1; and the secondary winding CT2s of positive feedback current transformer CT2 is connected directly between the base and the emitter of transistor Q2.

The collector of transistor Q1 is connected directly with the B+ bus; the emitter of transistor Q2 is connected directly with the B− bus; and the emitter of transistor Q1 is connected directly with the collector of transistor Q2, thereby forming junction QJ.

One terminal of capacitor C1 is connected directly with the B+ bus, while the other terminal of capacitor C1 is connected with a junction CJ. One terminal of capacitor C2 is connected directly with the B− bus, while the other terminal of capacitor C2 is connected directly with junction CJ.

An inductor L and a capacitor C are connected in series with one another and with the primary windings CT1p and CT2p of current transformers CT1 and CT2.

The series-connected primary windings CT1p and CT2p are connected directly between junction QJ and a point X. Inductor L is connected with one of its terminals to point X and with the other of its terminals to one of the terminals of capacitor C. The other terminal of capacitor C is connected directly with junction CJ.

A fluorescent lamp FL is connected, by way of lamp sockets S1 and S2, in parallel-circuit across capacitor C.

Inductor L has two auxiliary low-voltage windings LVW1 and LVW2 which are connected respectively with the two lamp sockets S1 and S2.

A varistor V and primary winding CCTp of a clamping-current-transformer CCT are connected in series across capacitor C.

One terminal of the secondary winding CCTs of transformer CCT is connected with the B− bus; the other terminal of this secondary winding is connected with the anode of a high speed rectifier HSR1. The cathode of rectifier HSR1 is connected to the positive terminal of an energy-storing capacitor EC by way of a resistor R. The negative terminal of capacitor EC is connected directly to the B− bus. A bleeding resistor R1 is connected directly across capacitor EC.

Similarly, one terminal of secondary winding of GFCTs of ground-fault-current-transformer GFCT is connected with the B− bus; the other terminal of this secondary winding is connected with the anode of another high speed rectifier HSR2. The cathode of rectifier HSR2 is connected to the positive terminal of energy-storing capacitor EC.

A Diac D1 is connected between the positive terminal of EC and the cathode of still another high speed rectifier HSR3. The anode of rectifier HSR3 is connected to the B− bus.

Between the cathode of rectifier HSR3 and the base of an auxiliary transistor Qa is connected to resistor R2.

The collector of transistor Qa is connected directly to the base of transistor Q2, and the emitter of transistor Qa is connected directly to B− bus.

The combination of varistor V, clamping-current-transformer CCT, rectifier HSR1, resistor R, ground-fault-current-transformer GFCT, rectifier HSR2, capacitor EC, Resistor R1, Diac D1, rectifier HSR3, resistor R2 and transistor Qa is referred to as sub-assembly A.

A series-combination of a capacitor C3 and a Diac D2 is connected between the B+ bus and the base of transistor Q2.

Representative values and designations of the various parts of the circuit of FIG. 1 are indicated as follows:

| | |
|---|---|
| Output of Source S: | 120 Volt/60 Hz; |
| Bridge rectifier BR: | a bridge of four 1N4004's; |
| Capacitors C1 & C2: | 100 uF/100 Volt Electrolytics; |
| Transistors Q1 & Q2: | Motorola MJE13002's; |
| Capacitor C: | 15 nF/1000 Volt(High-Q); |
| Flourescent Lamp FL: | Sylvania Octron F032/31k, |
| Varistor V: | MARCON (Toshiba) TNR23G391KM; |
| High-Speed Rectifiers HSR1, HSR2 & HSR3 | 1N4937's; |
| Resistor R1: | 68KOhm/0.25 Watt; |
| Capacitor EC: | 33 uF/35 Volt Electrolytic; |
| Diacs D1 & D2: | 1N5760's; |
| Resistor R2: | 1kOhm/0.25 Watt; |
| Transistor Qa: | 2N4401; |
| Capacitor C3: | Volt; |
| Transformers CT1 & CT2: | Wound on Ferroxcube Toroids 213T050 of 3E2A Ferrite Material with three turns of #26 wire for the primary windings and ten turns of #30 wire for the secondary windings; |
| Inductor L: | 140 turns of three twisted strands of #30 wire on a 3019P-L00-3C8 Ferroxcube Ferrite Pot Core with a 120 mil air gap, with auxiliary windings LVW1 and LVW2 each being just a single turn of #30 wire; |
| Transformer CCT: | Wound on Magnetics Toroid 40503-TC of W Ferrite Material with five turns of #28 wire for the primary winding and 20 turns of #32 wire for the secondary winding; |
| Transformer GFCT: | Wound on Magnetics Toroid OJ-41003-TC of J Ferrite Material with 15 turns of #28 wire for the dual primary windings and 30 turns of #32 wire for the secondary winding. |

The frequency of inverter oscillation associated with the component values identified above is approximately 33 kHz.

Description of Operation

In FIG. 1, the source S represents an ordinary electric utility power line, the voltage from which is applied through the dual primary windings GFCTp1 and GFCTp2 of ground-fault-current-transformer GFCT and then to the bridge rectifier identified as BR. This bridge rectifier is of conventional construction and provides for the rectified line voltage to be applied to the inverter by way of the B+ bus and the B− bus.

The two energy-storing capacitors C1 and C2 are connected directly across the output of the bridge rectifier BR and serve to filter the rectified line voltage, thereby providing for the voltage between B+ bus and the B− bus to be substantially constant. Junction CJ between the two capacitors serves to provide a power supply center tap.

The inverter circuit of FIG. 1, which represents a so-called half-bridge inverter, operates in a manner that is analogous with circuits previously described in published literature, as for instance in U.S. Pat. No. 4,184,128 entitled High Efficiency Push-Pull Inverters.

Upon initial application of power to the circuit, inverter oscillation is initiated by way of one or a few trigger pulses applied to the base of transistor Q2 by way of the combination of capacitor C3 and Diac D2. Of course, once the magnitude of the B+ voltage has stabilized, no further trigger pulses will be provided; and, if for some reason the inverter ceases to oscillate, the only way to get it restarted is to remove and then re-apply the power line voltage. (To permit speedy inverter re-starting, a bleeding resistor may be connected between the B+ bus and the B− bus.)

The output of the half-bridge inverter is a substantially squarewave 33 kHz AC voltage provided between point X and junction CJ. Directly across this output is connected a resonant or near-resonant LC series circuit—with the fluorescent lamp connected in parallel with the tank-capacitor thereof.

The resonant or near-resonant action of the LC series circuit provides for appropriate lamp starting and operating voltages, as well as for proper lamp current limiting; which is to say that it provides for appropriate lamp ballasting.

The essential feature of the present invention involves that of disabling the inverter in case:

(a) The inverter output power (i.e., the voltage across the tank-capacitor) remains at an abnormally high level for more than the brief period (one second or so) that it normally takes for the fluorescent lamp to start; or (b) There is an excessive flow of ground-fault-current (such as would occur if a person were to constitute an electrical path between the terminals of lamp socket S2 and earth ground) for more than a very brief moment (25 milli-second or so).

More particularly, when the inverter is operating, the voltage developed across the tank-capacitor is essentially only limited by the voltage-clamping characteristics of either the fluorescent lamp FL or the Varistor V—i.e., by the one which clamps at the lower voltage. If the lamp is inoperable, or if the lamp is removed from the circuit, or during the brief period before the lamp ignites, the Varistor acts as the principal voltage-clamping means; and the circuit load current then flows through this Varistor. As soon as the lamp gets into operation, however, the voltage across the tank-capacitor (and thereby across the Varistor) falls to a magnitude that is so low that current will no longer flow through the Varistor.

In the arrangement of FIG. 1, the various relevant voltage and current magnitudes are approximately as follows: (i) maximum required lamp starting voltage: 350 Volt RMS for not more than 1000 milli-second; (ii) Varistor maximum RMS operating voltage, approximate clamping effective voltage, and single-pulse energy handling capability: 250 Volt RMS, 391 Volt RMS and 130 Joules, respectively; lamp operating voltage and current: 140 Volt RMS and 0.2 Amp RMS, respectively.

In an LC series-resonant circuit, the power provided to a resistive load connected in parallel with the circuit tank-capacitor is approximately proportional to the magnitude of the RMS voltage developed thereacross. Hence, in FIG. 1, as long as the parameters of the LC circuit have been arranged to provide the fluorescent lamp with its required 0.2 Amp operating current at 140 Volt RMS (which corresponds to 28 Watt), the load power resulting at higher voltages will be roughly proportionally larger. Thus, at the point where the Varistor is clamping (at about 391 Volt RMS), the power provided to the Varistor is on the order of 80 Watt. However, since the fluorescent lamp is supposed to start within 1000 milli-second, the total cumulated energy dissipation in the Varistor is limited by the lamp to about 80 Joule.

Thus, under normal conditions, current will flow through the Varistor for but a brief period of time. Thereafter, the lamp starts and the Varistor in effect gets disconnected.

However, if the lamp is inoperative or not connected, the amount of energy that would be dissipated in the Varistor would rapidly exceed its energy-handling capability. In particular, for the parameters indicated above, the maximum energy capable of being absorbed by the Varistor would be reached in about 1600 milli-second.

As long as current is flowing through the Varistor, it also flows through the primary winding CCTp of clamping-current-transformer CCT; which roughly implies that a corresponding output current can be obtained from the secondary winding CCTs. By way of rectifier HSR1 and resistor R, the positive component of this output current is used for charging energy-storing capacitor EC; which, after a brief period, accumulates a charge and develops a corresponding voltage. After this capacitor voltage has reached a magnitude high enough to cause the Diac D1 to break down, the accumulated charge on the capacitor is discharged into the base of transistor Qa—the magnitude of the discharge current being limited by the resistance of R2.

With a Diac breakdown voltage of about 30 Volt and a capacitance value of 33 uF for the energy-storing capacitor EC, the amount of charge accumulated at the point of breakdown is about 1 milli-Coulomb. Thus, if the breakdown is to occur in a time period of about 1000 milli-second (which is chosen as being a suitable value), the magnitude of the current supplied to the capacitor would have to be about 1 milli-Amp. To achieve this particular value of time, the value of resistor R has to be chosen correspondingly.

Now, as the Diac breaks down, the 1 milli-Coulomb charge on capacitor EC discharges into the base of Qa—limited mainly by the 1 kilo-Ohm resistance of R2. With the Qa transistor being thusly switched into a conductive state, albeit for just a brief moment, a very low impedance path is provided between the base and the emitter of transistor Q2. As a result, the inverter feedback path is broken and the inverter stops oscillating.

(And, of course, once it has stopped oscillating, the inverter will not restart until trigger pulses are provided by way of Diac D2; and these trigger pulses will not occur until the B+ voltage is made to change significantly. Thus, without having made other provisions, the inverter will not restart until the power line voltage has been removed and then re-applied at a later time—after much of the charge on the filter capacitors has had a chance to leak off.)

Thus, under normal conditions, the ballasting arrangement of FIG. 1 will operate in an entirely conventional manner; except that, if the fluorescent lamp were to be removed from its sockets (or fail to operate), the inverter will become disabled within a period of about one second.

However, if a "grounded" person were to connect with socket S2 directly or indirectly, ground-fault-current would flow; and this ground-fault-current would have to flow through either one or both of the dual primary windings of transformer GFCT.

But, with ground-fault-current flowing in the primary windings of transformer GFCT, a corresponding current will be provided at its secondary winding; which output current provides for capacitor EC to charge up and therefore eventually to cause breakdown of Diac D1 and disablement of the inverter.

With the indicated turns-ratio of the ground-fault-current-transformer GFCT, the time it takes for capacitor EC to charge to the point of causing Diac breakdown and inverter disablement is very short. For instance, with a ground-fault-current of 200 milli-Amp, the resulting effective charging current will be about 40 milli-Amp; which (even if capacitor EC started out without any initial charge) would only need to flow for 25 milli-second or so to provide the requisite 1 milli-Coulomb charge, thereby to cause Diac breakdown and inverter disablement.

Of course, at lower levels of ground-fault-current, it would take longer to reach the point of inverter disablement; but that would normally be considered acceptable from a safety viewpoint.

(However, by different choices of circuit component parts, it is simply possible to design for an even shorter time for causing inverter disablement in response to the flow of ground-fault-current.)

It is important to recognize that during normal starting and operation of the fluorecent lamp, some ground-fault-current will be flowing due to the fact that there normally will be some form of grounded metal structure located near the fluorescent lamp; which does represent capacitive coupling between lamp and ground, and which will give rise to a corresponding capacitive ground-fault-current. In some situations, the magnitude of this predominantly capacitive component of ground-fault-current may be large enough to interfere with the effective operation of the inverter disablement circuit.

However, to mitigate this problem, it is simply possible to provide for a compensating or cancelling flow of capacitive current through the ground-fault-current-transformer. For instance, this may be accomplished by connecting a small capacitor between one of the terminals of socket S2 and one of the terminals of the secondary winding of the ground-fault-current-transformer.

It is believed that the present invention and its several attendant advantages and features will be understood from the preceeding description. However, without departing from the spirit of the invention, changes may be made in its form and in the constuction and interrelationships of its component parts, the form herein presented merely representing the preferred embodiment.

I claim:

1. A ballast for a gas discharge lamp, said lamp having a pair of electrodes and requiring thereacross in order to initiate lamp operation an initial relatively high-magnitude lamp starting voltage for a relatively brief period of time, said ballast being adapted to be powered from an ordinary electric utility power line ande comprising:

rectifier-means connected in circuit with said power line by way of a pair of power-line-wires and operative to provide a DC voltage;

inverter-means connected with said DC voltage and operative to provide a high-frequency-voltage at an AC output, said high-frequency-voltage having a fundamental frequency that is substantially higher than that of the voltage normally present on said power line;

tuned-circuit-means connected in circuit with said AC output, said tuned-circuit-means being substantially resonant at the fundamental frequency of said high-frequency-voltage and having a pair of output terminals with a tuned-circuit-voltage thereacross, the presence of said tuned-circuit-voltage being a response to the presence of said high-frequency-voltage;

lamp-socket-means connected in circuit with said pair of output terminals and operable to permit disconnectable connection of said gas discharge lamp therewith;

disable-means connected in circuit with said inverter-means and operable, upon the receipt of a disable-signal, to disable the operation of said inverter-means, thereby to remove said tuned-circuit-voltage from said pair of output terminals;

voltage-sensing-means connected in circuit with said pair of output terminals and operable to provide said disable-signal to said disable-means whenever the magnitude of said tuned-circuit-voltage has remained at or above a pre-determined level for a time longer than a certain first length of time, said pre-determined level being of a magnitude at least equal to that of said relatively high-magnitude lamp starting voltage and said certain first length of time being at least equal in length to that of said relatively brief period of time; and current-sensing-means operative to sense the flow of high-frequency-current through said pair of power-line-wires and to provide said disable-signal to said disable-means whenever said high-frequency-current has been flowing for a time longer than a certain second length of time, said high-frequency-current having a fundamental frequency that is substantially the same as that of said high-frequency-voltage.

2. The ballast of claim 1 wherein the length of said relatively brief period of time is on the order of one second.

3. The ballast of claim 2 wherein said certain second length of time is substantially shorter than about one second.

4. The ballast of claim 1 wherein said tuned-circuit-means comprises a series-resonant LC circuit.

5. A ballast for a fluorescent lamp, said fluorescent lamp having a pair of thermionic cathodes, each such cathode having a lamp input terminal, said lamp requiring in order to get started the presence of a relatively high-magnitude starting voltage across said pair of cathodes for a relatively brief period of time, said ballast being adapted to be powered from an ordinary electric utility power line and comprising:

rectifier-means connected in circuit with said power line by way of a pair of power-line-wires and operative to provide a DC voltage;

inverter-means connected with said DC voltage and operative to provide a high-frequency-voltage across a pair of output terminals, said high-frequency-voltage having a fundamental frequency that is substantially higher that that of the voltage normally present on said power line;

lamp-connect-means connected in circuit with said pair of output terminals and operable to permit disconnectable connection with each of said lamp input terminals;

disable-means connected in circuit with said inverter-means and operable, upon the receipt of a disable-signal, to disable the operation of said inverter-means, thereby to remove said high-frequency-voltage, from said pair of output terminals;

voltage-sensing-means connected in circuit with said pair of output terminals and operable to provide said disable-signal to said disable-means whenever the magnitude of said high-frequency-voltage has remained equal to or larger than that of said relatively high-magnitude starting voltage for a length of time that is at least equal to that of said relatively brief period of time; and current-sensing-means operative to sense the flow of high-frequency-current through said pair of power-line-wires and to provide said disable-signal to said disable-means whenever said high-frequency-current has been flowing for longer than a certain short length of time, said high-frequency-current being of a frequency substantially the same as that of said high-frequency-voltage.

6. The ballast of claim 5 wherein the length of said relatively brief period of time is on the order of one second.

7. The ballast of claim 6 wherein said certain short length of time is on the order of 25 milli-second.

8. A ballast for a gas discharge lamp, said ballast adapted to be powered from a voltage source and comprising:

voltage-conversion-means connected in circuit with said voltage source and operable to provide a current-limited AC voltage across a pair of output terminals;

connect-means connected with said pair of output terminals and operative to permit connection thereto of a gas discharge lamp, said gas discharge lamp requiring a starting voltage of relatively high magnitude for a relatively brief period of time in order to initiate proper lamp operation;

disable-means operative, upon the receipt of a disable-signal, to remove said AC voltage from said output terminals;

voltage-sensing-means connected in circuit with said pair of output terminals and operative to provide said disable-signal to said disable-means whenever the magnitude of said AC voltage has remained equal to or larger than that of said starting voltage for longer than a relatively brief period of time; and current-sensing-means operative to sense the flow of ground-fault-current between said pair of output terminals and said voltage source, and to provide said disable-signal to said disable-means after said ground-fault-current has been flowing for longer than a very short period of time.

9. The ballast of claim 8 wherein said gas discharge lamp is a fluorescent lamp.

10. The ballast of claim 8 wherein said voltage source is an ordinary electric utility power line.

11. The ballast of claim 8 wherein said very short period of time is one the order of 25 milli-second.

12. The ballast of claim 9 wherein said relatively brief period of time is on the order of one second.

13. The ballast of claim 8 wherein said voltage-conversion-means comprises an inverter means.

*14. A ballast for a gas discharge lamp, said lamp having a pair of electrodes and requiring thereacross, in order to initiate lamp operation, an initial relatively high-magnitude lamp starting voltage for a relatively brief period of time, said ballast being adapted to be powered from an ordinary electric utility power line and comprising:*

*rectifier-means connected in circuit with said power line by way of a pair of power-line-wires and operative to provide a DC voltage;*

*inverter-means connected with said DC voltage and operative to provide a high-frequency-voltage having a fundamental frequency that is substantially higher than that of the voltage normally present on said power line;*

*tuned-circuit-means connected in circuit with said AC output, said tuned-circuit-means being substantially resonant at the fundamental frequency of said high-frequency-voltage and having a pair of output terminals with a tuned-circuit-voltage thereacross, the presence of said tuned-circuit-voltage being a response to the presence of said high-frequency-voltage;*

*lamp-socket-means connected in circuit with said pair of output terminals and operable to permit disconnectable connection of said gas discharge lamp therewith;*

*disable-means connected in circuit with said inverter means and operable, upon the receipt of a disable-*signal, to disable the operation of said inverter-*means, thereby to remove said tuned-circuit-voltage from said pair of output terminals;*

*voltage-clamping-means connected in circuit with said pair of output terminals and operative, by drawing current therefrom, to limit the magnitude of said tuned-circuit-voltage present thereacross to a level that is about equal to or somewhat larger than said relatively high-magnitude lamp starting voltage; and*

*sensing-means connected in circuit with said voltage-*clamping-*means and operable to provide said disable-signal to said disable-means whenever said voltage-clamping-means has drawn current from the output terminals for longer than a brief period of time;*

*whereby, if a gas discharge lamp is not connected with said lamp-socket-means and thereby operative to constitute a load for said tuned-circuit-means, the inverter means is disabled within a brief period of time.*

*15. The ballast of claim 14 wherein said voltage-clamping-means comprises non-linear resistive means.*

*16. An arrangement comprising:*

*power supply means conditionally operable to supply a magnitude-limited current from a pair of output terminals adapted to connect with a load, the power supply means having disable means operative, on the receipt of a disable signal, to prevent said magnitude-limited current from being supplied;*

*voltage clamping means connected in circuit with the output terminals and operative, by way of drawing current therefrom, to prevent the magnitude of any voltage present thereat from substantially exceeding a predetermined level; and*

*sensing means connected in circuit with the voltage clamping means and operative to provide said disable signal whenever the voltage clamping means has been drawing current for longer than a certain period of time.*

*17. The arrangement of claim 16 wherein the voltage clamping means comprises non-linear resistance means.*

*18. The arrangement of claim 16 wherein the voltage clamping means draws substantially no current when the magnitude of any voltage present at the output terminals is below said predetermined level.*

*19. The arrangement of claim 16 wherein the power supply means: (i) comprises frequency converter means connected in circuit between an ordinary electric utility power line and the output terminals, and (ii) is operative to cause the magnitude-limited current supplied from those output terminals to be of a frequency substantially higher than that of the voltage on the power line.*

*20. The arrangement of claim 19 wherein the frequency converter means comprises tuned LC circuit means connected in circuit with the output terminals and being substantially resonant at the frequency of the magnitude-limited current.*

*21. The arrangement of claim 16 wherein a load is indeed connected and wherein this load is a gas discharge lamp.*

*22. The arrangement of claim 21 wherein, whenever the load is indeed connected and drawing power, the magnitude of the voltage present at the output terminals is prevented from reaching said predetermined level.*

*23. The arrangement of claim 16 wherein the duration of the certain period of time is not longer than about one second.*

*24. The combination comprising:*

*a power supply conditionally operable to supply current from a pair of output terminals, the power supply having disable means operative, on receipt of a disable input, to stop the supply of current from the output terminals;*

*voltage limiting means connected with the output terminals and operative, by drawing current therefrom, to prevent any voltage present thereacross from substantially exceeding a predetermined level;*

*sensing means connected in circuit with the voltage limiting means and with the disable means and operative to provide said disable input in case the voltage limiting means has drawn current from the output terminals for longer than a certain period of time; and*

*load means operative to connect with the output terminals and, when indeed so connected and when in proper operating condition, functional to prevent the magnitude of any voltage present across the output terminals from reaching the predetermined level for any length of time longer than said certain period of time.*

*25. The combination of claim 24 wherein the load means comprises a gas discharge lamp.*

*26. The combination of claim 24 wherein said power supply comprises:*

*rectifier means connected with an ordinary electric utility power line and operative to provide a DC voltage at a pair of DC terminals;*

*inverter means connected with the DC terminals and operative to provide a squarewave voltage at a pair of squarewave terminals;*

*a series-combination of a capacitor and an inductor connected across the squarewave terminals, the series-combination being series-resonant at or near the frequency of the squarewave voltage; and*

*connect means operative to connect the output terminals in parallel-circuit with the capacitor.*

*27. An arrangement comprising:*

*rectifier means connected with an ordinary electric utility power line and operative to provide a DC voltage at a set of DC terminals;*

*inverter means connected with the DC terminals, the inverter means having disable means receptive of a disable input and being operative, except after having received the disable input, to provide a substantially squarewave voltage at a set of squarewave terminals;*

*LC circuit having a capacitor interconnected with an inductor and being connected with the squarewave terminals, the LC circuit means being series-resonant at or near the frequency of the squarewave voltage;*

*output terminals connected in parallel-circuit with the capacitor and operative to provide output current therefrom;*

*gas discharge lamp means operative to be connected with the output terminals and operative, when so connected, to receive at least part of the output current therefrom;*

*voltage-limiting means connected with the output terminals and operative, by way of drawing at least part of the output current therefrom, to prevent the magnitude of the voltage present thereacross from substantially exceeding a predetermined level; and*

*sensing means connected in circuit between the output terminals and the disable means, the sensing means being operative to provide the disable input in case the voltage-limiting means has drawn the output current for longer than a certain length of time.*

*28. The arrangement of claim 27 wherein the gas discharge lamp is characterized by having a starting voltage of magnitude about equal to said predetermined level and an operating voltage of magnitude substantially smaller than said predetermined level, the starting voltage prevailing during a starting mode of relatively brief duration, during which starting mode the lamp ignites and enters into a substantially continuous operating mode, the operating voltage prevailing during the operating mode;*

*thereby to prevent the voltage-limiting means from drawing any significant part of the output current during the operating mode.*

*29. The arrangement of claim 28 wherein the certain length of time is on the order of one second or less.*

*30. An arrangement comprising:*

*source means conditionally operable to provide an AC voltage at a set of AC terminals, the source means having disable means operative to disable its operation on receipt of a disable input, thereby to remove the AC voltage from the AC terminals;*

*a series-*combination of a capacitor and an inductor, the series-*combination: (i) being series-resonant at or about the frequency of the AC voltage, (ii) being connected with the AC terminals, (iii) having a pair of output terminals effectively connected in parallel-circuit with the capacitor, and (iv) being operative to provide an AC output current from these output terminals;*

*voltage-limiting means connected with the output terminals and operative, by way of absorbing at least part of the AC output current, to limit the magnitude of any voltage present thereacross to a predetermined level;*

*load means operative to be connected with the output terminals and to absorb at least part of the AC output current; and*

*sensor means connected in circuit between the voltage-limiting means and the disable means and operative to provide the disable input in case the voltage-limiting means were to absorb a substantial part of the AC output current for longer than a certain brief period of time.*

*31. The arrangement of claim 30 wherein the load means, as long as indeed connected, is operative to absorb substantially all of the AC output current, thereby preventing the voltage-limiting means from having to absorb a substantial part of the AC output current.*

*32. The arrangement of claim 31 wherein the load means comprises a gas discharge lamp.*

*33. The arrangement of claim 31 combined with ground fault detection means connected in circuit with the power line and operative, in response to any flow of unbalanced AC current from the output terminals, to provide the disable input.*

*34. The arrangement of claim 31 wherein: (i) the voltage-limiting means comprises non-linear resistive means, and (ii) the certain brief period of time is of a length not exceeding about one second, thereby preventing an excessive amount of energy from being dissipated in the non-linear resistive means.*

* * * * *